(12) United States Patent
Wang et al.

(10) Patent No.: US 12,020,518 B2
(45) Date of Patent: Jun. 25, 2024

(54) VEHICLE INSPECTION METHOD, APPARATUS AND SYSTEM, AND COMPUTER-READABLE STORAGE MEDIUM

(71) Applicants: NUCTECH COMPANY LIMITED, Beijing (CN); NUCTECH (BEIJING) COMPANY LIMITED, Beijing (CN); TSINGHUA UNIVERSITY, Beijing (CN)

(72) Inventors: Yongming Wang, Beijing (CN); Junjie Tu, Beijing (CN); Chuan Gao, Beijing (CN); Yanwei Xu, Beijing (CN); Weifeng Yu, Beijing (CN); Chunguang Zong, Beijing (CN); Yu Hu, Beijing (CN)

(73) Assignees: NUCTECH COMPANY LIMITED, Beijing (CN); NUCTECH (BEIJING) COMPANY LIMITED, Beijing (CN); TSINGHUA UNIVERSITY, Beijing (CN)

( * ) Notice: Subject to any disclaimer, the term of this patent is extended or adjusted under 35 U.S.C. 154(b) by 319 days.

(21) Appl. No.: 17/421,709

(22) PCT Filed: Jan. 23, 2020

(86) PCT No.: PCT/CN2020/073946
§ 371 (c)(1),
(2) Date: Jul. 8, 2021

(87) PCT Pub. No.: WO2020/207104
PCT Pub. Date: Oct. 15, 2020

(65) Prior Publication Data
US 2022/0084336 A1    Mar. 17, 2022

(30) Foreign Application Priority Data

Apr. 9, 2019    (CN) .......................... 201910279867.8

(51) Int. Cl.
*G07C 5/08* (2006.01)
*B60W 40/10* (2012.01)

(52) U.S. Cl.
CPC .......... *G07C 5/0825* (2013.01); *B60W 40/10* (2013.01); *G07C 5/0808* (2013.01); *B60W 2554/4041* (2020.02); *B60W 2554/4049* (2020.02)

(58) Field of Classification Search
CPC ...... G07C 5/08; G07C 5/0808; G07C 5/0825; G01V 5/00; G01B 15/00; G01B 15/04
(Continued)

(56) References Cited

U.S. PATENT DOCUMENTS 9,817,149 B2 * 11/2017 Li .......................... G01N 23/083
10,129,971 B2 * 11/2018 Sun ......................... H05H 9/048
(Continued)

FOREIGN PATENT DOCUMENTS

CN    104391338 U    3/2015
CN    104641253 A    5/2015
(Continued)

OTHER PUBLICATIONS

ISR for International Application No. PCT/CN2020/073946.
First OA received in CN Application No. 201910279867.8; mailed Feb. 7, 2024.

*Primary Examiner* — Andrew Joseph Rudy

(57) ABSTRACT

This disclosure provides a vehicle inspection method, apparatus, system, and computer-readable storage medium and relates to the field of security inspection technologies. The vehicle inspection method of the present disclosure includes: acquiring vehicle profile information of a vehicle through a first sensor that performs measurement in a direction perpendicular to a passage, and determining a feature point of the vehicle according to the vehicle profile information; determining a position of the vehicle in the passage through
(Continued)

a second sensor that performs measurement in a direction along the passage, and determining a position of the feature point according to the position of the vehicle in the passage; and switching an operating mode of a ray source based on a preset strategy according to a position relation between the position of the feature point and the ray source.

17 Claims, 7 Drawing Sheets

(58) Field of Classification Search
USPC .......................................................... 709/29.1
See application file for complete search history.

(56) References Cited

U.S. PATENT DOCUMENTS

| | | | | |
|---|---|---|---|---|
| 10,365,234 | B2* | 7/2019 | Wang | .................... G01V 5/0016 |
| 10,754,056 | B2* | 8/2020 | Li | ......................... G01V 5/0016 |
| 2004/0017887 | A1 | 1/2004 | Le et al. | |
| 2008/0298545 | A1* | 12/2008 | Bueno | .................. G01V 5/0025 378/57 |
| 2015/0078528 | A1 | 3/2015 | Okada | |
| 2017/0010383 | A1 | 1/2017 | Mircea | |
| 2017/0090062 | A1 | 3/2017 | Cao et al. | |

FOREIGN PATENT DOCUMENTS

| | | | |
|---|---|---|---|
| CN | 106290422 | A | 1/2017 |
| CN | 106353831 | A | 1/2017 |
| CN | 106969715 | A | 7/2017 |
| CN | 107655906 | A | 2/2018 |
| CN | 107664774 | A | 2/2018 |
| CN | 207689689 | U | 8/2018 |
| CN | 109917479 | A | 6/2019 |
| EP | 2988151 | A2 | 2/2016 |
| EP | 3273275 | A1 | 1/2018 |
| EP | 3035086 | B1 | 7/2021 |
| WO | 2013142853 | A1 | 9/2013 |

* cited by examiner

VEHICLE INSPECTION METHOD, APPARATUS AND SYSTEM, AND COMPUTER-READABLE STORAGE MEDIUM

CROSS-REFERENCES TO RELATED APPLICATIONS

The present disclosure is a national phase application of International Application No. PCT/CN2020/073946, filed on Jan. 23, 2020, which claims the priority to the Chinese Patent Application No. 201910279867.8, filed on Apr. 9, 2019, the entireties of which are herein incorporated by reference.

FIELD

This disclosure relates to the field of security inspection technologies, and in particular, to a vehicle inspection method, apparatus, system, and computer-readable storage medium.

BACKGROUND

A truck cab avoidance system is generally used for X-ray-based quick vehicle inspection. A vehicle itself passes through an X-ray inspection area, and when the cab of the vehicle is passing by, the inspection system emits rays with a low dose or does not emit rays; after the cab has passed through a set position, the system emits beams normally, to meet the requirement for a limit on a single-time dose absorbed by the driver in radiation protection.

SUMMARY

According to embodiments of the present disclosure, there is provided a vehicle inspection method comprising: acquiring vehicle profile information of a vehicle through a first sensor that performs measurement in a direction perpendicular to a passage, and determining a feature point of the vehicle according to the vehicle profile information; determining a position of the vehicle in the passage through a second sensor that performs measurement in a direction along the passage, and determining a position of the feature point according to the position of the vehicle in the passage; and switching an operating mode of a ray source based on a preset strategy according to a position relation between the position of the feature point and the ray source.

In some embodiments, the vehicle inspection method further includes: in the case that it is determined that the vehicle enters the passage, preheating the ray source.

In some embodiments, the vehicle inspection method further includes: when it is determined that the position of the vehicle in the passage reaches a preset trigger-blocking point, stopping preheating the ray source, and the ray source entering a normal operating state, and the trigger-blocking point is located between the ray source and an entrance of the passage.

In some embodiments, that switching an operating mode of the ray source based on a preset strategy according to a position relation between the position of the feature point and the ray source includes: determining a beam-stopping control point or a beam-emitting control point for trigger-blocking the switching of the operating mode of the ray source according to the position relation between the position of the feature point and the ray source; and when it is determined that the front edge of the vehicle reaches the beam-stopping control point or the beam-emitting control point of the front edge, or that the rear edge of the vehicle reaches the beam-stopping control point or the beam-emitting control point of the rear edge according to a detection result of the first sensor, switching the operating mode of the ray source based on the preset strategy.

In some embodiments, when it is determined that the front edge of the vehicle reaches the beam-stopping control point or the beam-emitting control point, or that the rear edge of the vehicle reaches the beam-stopping control point or the beam-emitting control point, that switching the operating mode of the ray source based on the preset strategy includes: when the position of the front edge or the rear edge of the vehicle is matched with the corresponding beam-emitting control point, controlling the ray source to start emitting rays in a next mode; and when the position of the front edge or the rear edge of the vehicle is matched with the corresponding beam-stopping control point, controlling the ray source to stop emitting rays in the current mode.

In some embodiments, the beam-stopping control point and the beam-emitting control point are located on a side of the ray source away from the entrance of the passage.

In some embodiments, the vehicle inspection method further includes: determining the number of times of switching the operating mode and the corresponding feature point of the vehicle in each switching according to the preset strategy; and the number of the beam-stopping control points and the beam-emitting control points is matched with the number of times of switching the operating mode.

In some embodiments, the first sensor is located on a side of the ray source close to the passage entrance, and a distance between the ray source and the first sensor is not less than a preset distance threshold.

In some embodiments, the feature point includes a rear edge of a cab; and that switching an operating mode of a ray source based on a preset strategy according to a position relation between the position of the feature point and the ray source includes: determining a length of the cab according to a position of the rear edge of the cab in the vehicle profile information, and determining the position of the front edge of the vehicle as the beam-emitting control point when the position of the rear edge of the cab is matched with the ray source; and when the position of the front edge of the vehicle is matched with that of the beam-emitting control point, controlling the ray source to start emitting rays.

In some embodiments, the feature point includes a rear edge of the cab; and that switching an operating mode of a ray source based on a preset strategy according to a position relation between the position of the feature point and the ray source includes: determining a length of the cab according to the position of the rear edge of the cab in the vehicle profile information, and determining the position of the rear edge of the vehicle as the beam-emitting control point when the position of the rear edge of the cab is matched with the ray source; and when the position of the rear edge of the vehicle is matched with that of the beam-emitting control point, controlling the ray source to start emitting rays.

In some embodiments, the feature point includes a rear edge of the vehicle; and that switching an operating mode of a ray source based on a preset strategy according to a position relation between the position of the feature point and the ray source includes: determining the position of the rear edge of the vehicle as the beam-stopping control point when the position of the rear edge of the vehicle is matched with that of the ray source, according to the position of the rear edge of the vehicle in the vehicle profile information; and when the position of the rear edge of the vehicle is matched with that of the beam-stopping control point, controlling the ray source to stop emitting rays.

In some embodiments, the feature point includes a rear edge of the vehicle; and that switching an operating mode of a ray source based on a preset strategy according to a position relation between the position of the feature point and the ray source includes: determining a length of the vehicle according to the position of the rear edge of the vehicle in the vehicle profile information, and determining the position of the front edge of the vehicle as the beam-stopping control point when the position of the rear edge of the vehicle is matched with that of the ray source; and when the position of the front edge of the vehicle is matched with that of the beam-stopping control point, controlling the ray source to stop emitting rays.

According to other embodiments of the present disclosure, there is provided a vehicle inspection control apparatus comprising: a vehicle profile information acquisition device, configured to acquire vehicle profile information of a vehicle through a first sensor that performs measurement in a direction perpendicular to a passage, and determine a feature point of the vehicle according to the vehicle profile information; a vehicle position determination device, configured to determine a position of the vehicle in the passage through a second sensor that performs measurement a direction along the passage, and to determine a position of the feature point according to the position of the vehicle in the passage; and an operating mode determination device, configured to switch an operating mode of a ray source based on a preset strategy according to a position relation between the position of the feature point and the ray source.

According to still other embodiments of the present disclosure, there is provided a vehicle inspection control apparatus comprising: a memory; and a processor coupled to the memory, the processor being configured to perform any of the vehicle inspection methods above based on instructions stored in the memory.

According to an embodiments of the present disclosure, there is provided a computer-readable storage medium having stored thereon computer program instructions which, when executed by a processor, implement steps of any of the vehicle inspection methods above.

In addition, according to some embodiments of the present disclosure, there is provided a vehicle inspection system comprising: a first sensor configured to perform measurement in a direction perpendicular to a passage, for acquiring vehicle profile information of a vehicle; a second sensor configured to perform measurement in a direction along the passage, for determining a position of the vehicle in the passage; a ray source, located in a direction of the first sensor away from an entrance, for emitting ray beams toward the passage; and, any of the vehicle inspection control apparatuses above.

In some embodiments, the vehicle inspection system includes one or more second sensors.

In some embodiments, the vehicle inspection system includes one or more ray sources.

BRIEF DESCRIPTION OF THE DRAWINGS

The accompanying drawings described herein are used for providing a further understanding of this disclosure and constitute a part of this disclosure, and the illustrative embodiments of this disclosure, together with the description, serve to explain, but not to limit this disclosure. In the drawings.

DETAILED DESCRIPTION OF THE DISCLOSURE

Embodiments of the present disclosure will be further described in detail through the accompanying drawings and disclosure.

In the related art, cab avoidance in a detection process is realized by:

① using multiple sets of photoelectric sensors, light curtains or regional laser sensors to measure speeds and positions of a vehicle in sections;
② using a group of measuring light curtains to plot a side projection binary image in a process of vehicle driving;
③ using a vehicle-type recognition algorithm to determine vehicle type and cab length data; and
④ sending out a cab avoidance signal at a set position by combining the cab length with the position and speed information of the vehicle.

In order to implement these ways, it is necessary to arrange multiple groups of light curtains, photoelectric sensors or regional laser sensors in a scanning passage, which covers a large area, involves a large amount of civil engineering and costs highly. In the process of vehicle driving, speed measurement in sections is adopted, resulting in low accuracy of speed measurement; the position of the vehicle is determined by the latest triggered sensor in combination with the product of speed and time, resulting in low accuracy of positioning. In practice, problems such as great changes of the vehicle speed and unreasonable settings of time protection parameters result in system abnormality, and thus, cause advancing emitting beams to bring the safety risk, or delaying emitting beams to bring lack of scanning imaging.

According to some embodiments of the present disclosure, a mode switching scheme in the vehicle detection process is provided to improve the accuracy of the timing for switching the operating mode.

Figure 1:
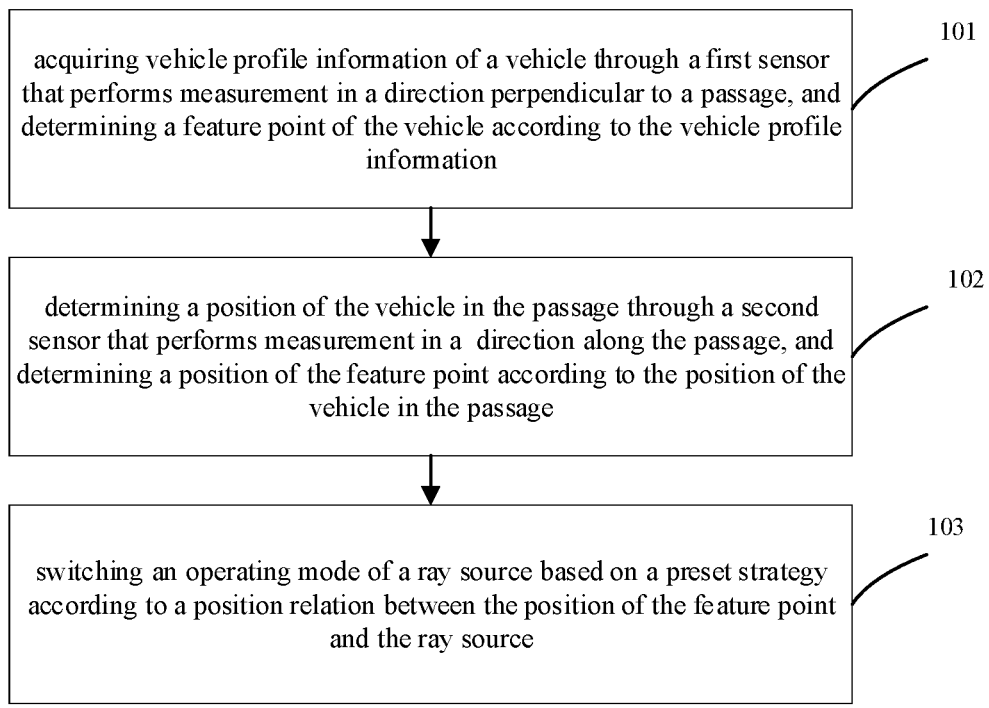
FIG. 1 is a flowchart of a vehicle inspection method according to some embodiments of the present disclosure.

A flowchart of a vehicle inspection method according to some embodiments of the present disclosure is shown in FIG. 1.

In step 101, vehicle profile information of a vehicle is acquired through a first sensor that performs measurement in a direction perpendicular to a passage, and a feature point of the vehicle is determined according to the vehicle profile information. In some embodiments, the feature point can includes one or more of a rear edge of a cab, a front edge of a warehouse, a rear edge of the vehicle, or the like. In some embodiments, the feature point can be any position on the vehicle where an operating mode of a ray source needs to be switched.

In step 102, a position of the vehicle in the passage is determined through a second sensor that performs measurement in a direction along a passage, and a position of the feature point is determined according to the position of the vehicle in the passage. In some embodiments, a position of the front edge or the rear edge of the vehicle can be determined, and then a distance between the front edge or the rear edge of the vehicle and the feature point can be determined according to the vehicle profile information, so that position changes of the feature point are reflected by detected position changes of the front edge or the rear edge of the vehicle. In some embodiments, the first and second sensors can be laser sensors.

In step 103, the operating mode of the ray source is switched based on a preset strategy according to a position relation between the position of the feature point and the ray source.

By this method, the position and the side profile of the vehicle can be obtained based on detection results of the first sensor and the second sensor, and then the timing for switching the operating mode of the ray source is determined through position matching, and improving the accuracy of the determined timing for switching the operating mode. In addition, such a method needs less sensors, and less space for equipment disposition, which reduces the cost of equipment disposition and improves flexibility of the disposition.

Figure 2:
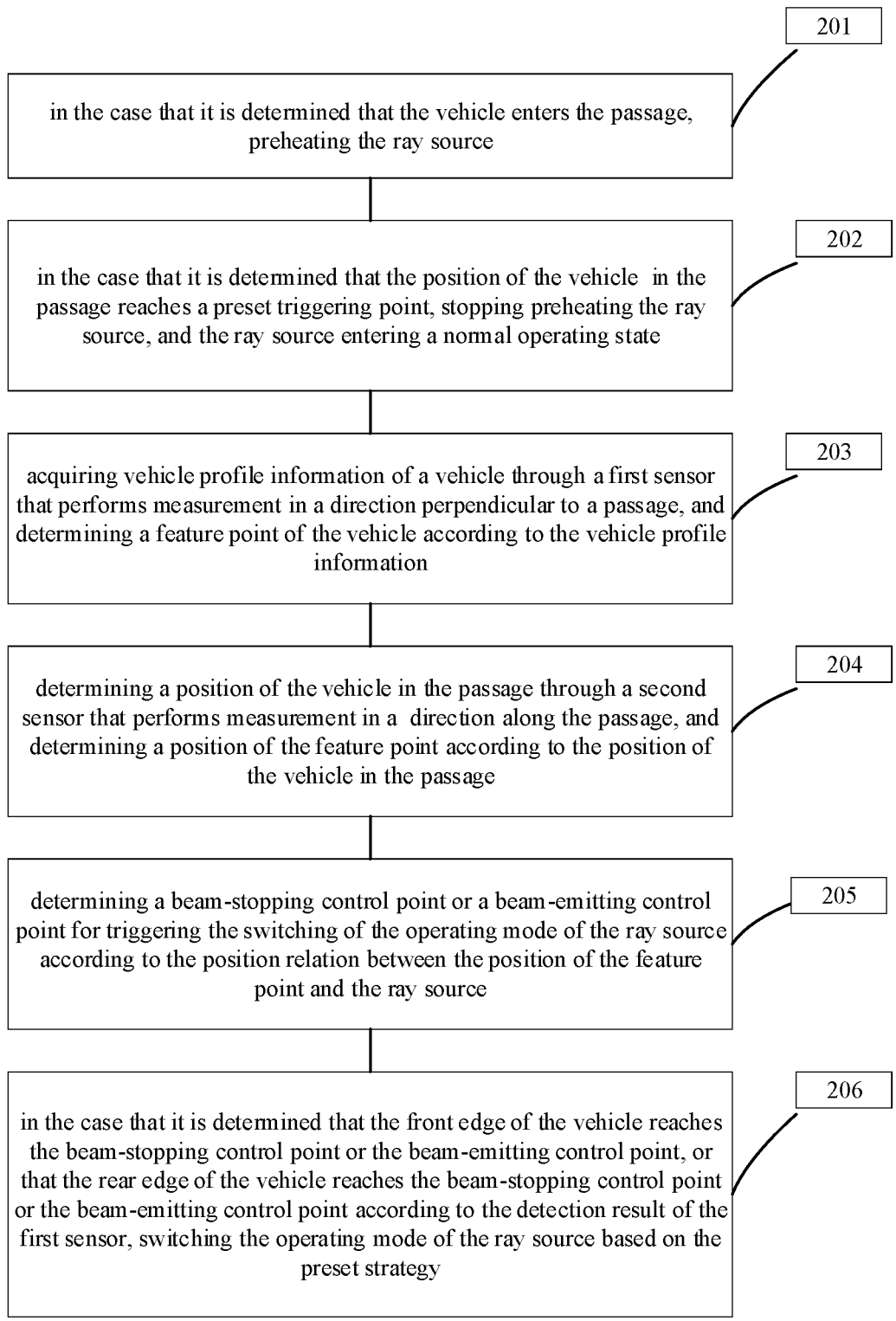
FIG. 2 is a flowchart of a vehicle inspection method according to other embodiments of the present disclosure.

A flowchart of a vehicle inspection method according to other embodiments of the present disclosure is shown in FIG. 2.

In step 201, in the case that it is determined that the vehicle enters the passage, the ray source is preheated. In some embodiments, the ray source can emit beams with a low dose in a preheating state, and reducing time delay of switching the ray source into a normal operating state and improving the efficiency of mode switching.

In step 202, when it is determined that the position of the vehicle in the passage reaches a preset trigger-blocking point, the preheating of the ray source is stopped to enter the normal operating state, and the trigger-blocking point is located between the ray source and a passage entrance. In some embodiments, the trigger-blocking point can be located between the first sensor and the ray source. In other embodiments, the trigger-blocking point can also be located between the first sensor and the passage entrance.

In some embodiments, the ray source can be switched into a low-dose operating state after the vehicle reaches the preset trigger-blocking point, and the radiation dose in the low-dose operating state meets the requirement for cab detection, to realize the subsequent cab detection.

In step 203, the vehicle profile information is acquired through the first sensor that performs measurement in the direction perpendicular to the passage, and the feature point of the vehicle is determined according to the vehicle profile information.

In some embodiments, the number of times of switching the operating mode and the corresponding feature point of the vehicle in each switching can be determined according to the preset strategy, and the determined feature point can be one or more.

In some embodiments, there is no time sequence to execute the steps 202 and 203. According to a difference between the trigger-blocking point and the position of the first sensor, the step 202 is executed when the vehicle (e.g., the front edge of the vehicle) reaches the preset trigger-blocking point. The step 203 is executed when the vehicle enters a detection range of the first sensor.

In some embodiments, the first sensor can be a two-dimensional or three-dimensional laser sensor. In some embodiments, the first sensor is two-dimensional laser sensor and detects a road direction by scanning in a vertical direction. A frame of data is generated after each column scanning is completed. Every time the number of scanned frames reaches a preset first number, a vehicle profile recognition algorithm is called to generate vehicle profile data until the scanning of the whole vehicle is completed, so that the vehicle profile recognition algorithm is called at a predetermined frequency, which reduces the resource consumption of data processing.

In step 204, the position of the vehicle in the passage is determined through the second sensor that performs measurement in the passage direction, and the position of the feature point is determined according to the position of the vehicle in the passage.

In some embodiments, there is no time sequence to execute detection operations of the steps 203 and 204. The operation of determining the position of the feature point according to the position of the vehicle in the passage needs to be performed after the corresponding feature point of the vehicle is determined according to the vehicle profile information.

In step 205, a beam-stopping control point or a beam-emitting control point for trigger-blocking the switching of the operating mode of the ray source is determined according to the position relation between the position of the feature point and the ray source. In some embodiments, the beam-stopping control point and the beam-emitting control point can be the position of the front edge or the rear edge of the vehicle when the position of the feature point is matched with that of the ray source. Because it is convenient to measure the positions of the front edge and the rear edge of the vehicle, it is unnecessary to calculate the position of the feature point according to the vehicle profile parameters when the feature point of the vehicle reaches the position of the ray source, which improves the efficiency of position matching.

In some embodiments, the position of the front edge or the rear edge of the detected vehicle can be determined according to the position relation between the second sensor and the vehicle. For example, the position of the front edge of the vehicle can be detected when the vehicle is moving toward the second sensor and does not reach the position of the second sensor; whereas the position of the rear edge of the vehicle can be detected when the vehicle is moving away from the position of the second sensor in a direction away from the second sensor. When the vehicle is passing by the second sensor, the front edge or the rear edge of the vehicle can be detected at will, or either of the two closer to the second sensor can be detected.

In some embodiments, the first sensor can stop acquiring the vehicle profile information after having scanned the cab of the vehicle, and the position information of the vehicle is acquired by the second sensor. By this method, the amount of the data acquired by the first sensor for processing can be reduced, the system load can be reduced, and the service life of the sensor can also be prolonged.

In some embodiments, the number of the beam-stopping control point and the beam-emitting control point can be determined according to the number of determined feature points. In some embodiments, the number of the feature points can be equal to a sum of the number of the beam-stopping control points and the beam-emitting control points.

In step 206, when it is determined that the front edge of the vehicle reaches the beam-stopping control point or the beam-emitting control point, or that the rear edge of the vehicle reaches the beam-stopping control point or the beam-emitting control point according to the detection result of the first sensor, the operating mode of the ray source is switched based on the preset strategy.

In some embodiments, when the position of the front edge or the rear edge of the vehicle is matched with the corresponding beam-emitting control point, the ray source is controlled to start emitting rays in a next mode; and when the position of the front edge or the rear edge of the vehicle is matched with the corresponding beam-stopping control point, the ray source is controlled to stop emitting rays in the current mode.

In some embodiments, corresponding relationships between the operating mode and identification points including the front edge or the rear edge of the vehicle, and between the operating mode and the beam-emitting control point or the beam-stopping control point can be generated, e.g., when the front edge of the vehicle reaches a first beam-emitting control point, a first operating mode is enabled, when the front edge of the vehicle reaches a second beam-emitting control point, the mode is switched into a second operating mode, and when the rear edge of the vehicle reaches a first beam-stopping control point, a third operating mode is enabled, and so on, and rapidly determining and switching the operating mode.

In some embodiments, different operating modes can includes the use of different ray sources, different ray intensities, different ray scanning modes, etc.

By this method, the positions of the control points can be determined by utilizing distances between the feature points and the identification points including the front edge or the rear edge of the vehicle, and the position of the ray source, and thus, the operating state of the ray source is switched in time when the front edge or the rear edge of the vehicle reaches the corresponding control point, and improving the timeliness and the accuracy of switching the operating mode of the ray source, and avoiding the safety risk caused by advancing emitting beams or the lack of scanning imaging caused by delaying emitting beams.

In some embodiments, as shown in FIGS. 3A to 3E, a one-dimensional coordinate system can be established in a direction along the passage axis. Taking the layout shown in FIG. 3A as an example, a regional laser sensor (second sensor) serves as an origin O, and the direction of vehicle driving is a positive direction. Other sensors or devices are arranged in this coordinate system, each having a position coordinate. The first sensor for acquiring the vehicle profile data is arranged at position S, and the first sensor can be a measuring light curtain, line array camera or regional laser sensor.

Taking the first sensor being a two-dimensional regional laser sensor as an example, according to control characteristics of an X-ray generator, three types of control points are includes in the system: ① trigger-blocking control point R, ② beam-emitting control point P, and ③ beam-stopping control point Q. The number of each of the three types of control points can be multiple. In some embodiments, the number of the points R and Q can be determined by the number of main beams of the ray source; and the number of the points P is determined by the number of the main beams and the requirement on a fine scanning process. In some embodiments, the number of the points Q can also be determined by the number of the main beams and the requirement on the fine scanning process.

When the vehicle enters the passage and reaches the position of an entrance (Enter) of the passage, the system sends out vehicle arrival information, and the scanning control system starts a corresponding process, such as starting applying a high voltage.

Figure 3A:
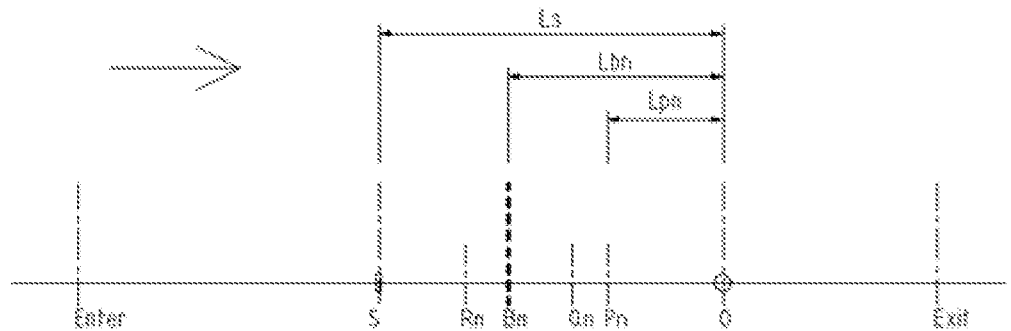
FIGS. 3A to 3E are schematic diagrams of a vehicle inspection method according to some embodiments of the present disclosure.
Figure 3B:
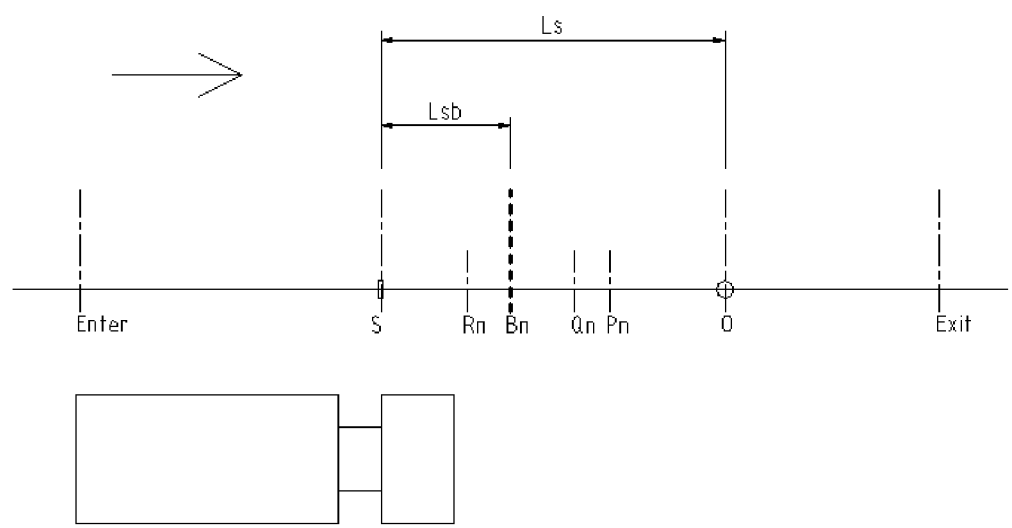

As shown in FIG. 3B, when the vehicle reaches the position S, the vehicle side profile data starts to be accumulated, and the vehicle profile recognition algorithm is called after the set number of frames is reached; and after the accumulated number of frames reaches twice the set number of frames, the recognition algorithm is called again until recognition results such as found information on the rear edge of the cab and the front edge length L of the vehicle are given in the algorithm, so that the recognition algorithm is called every time the preset number of frames has been scanned.

Figure 3C:
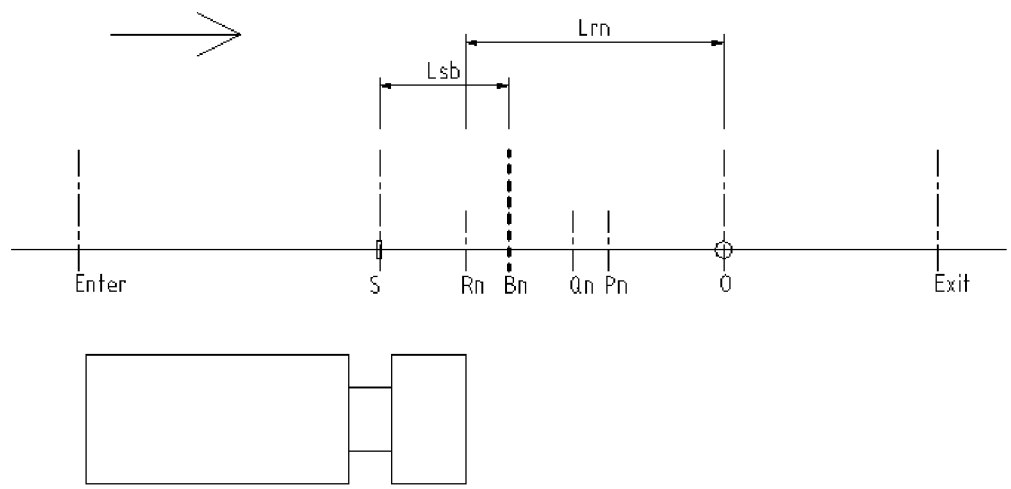

As shown in FIG. 3C, when the vehicle reaches positions, $R_1, R_2 \ldots R_i$ (i is the number of the points R and is a positive integer, and in the figure, n is a positive integer and $1 \leq n \leq i$), the scanning control subsystem adopts a corresponding control strategy, such as trigger-blocking.

Figure 3D:
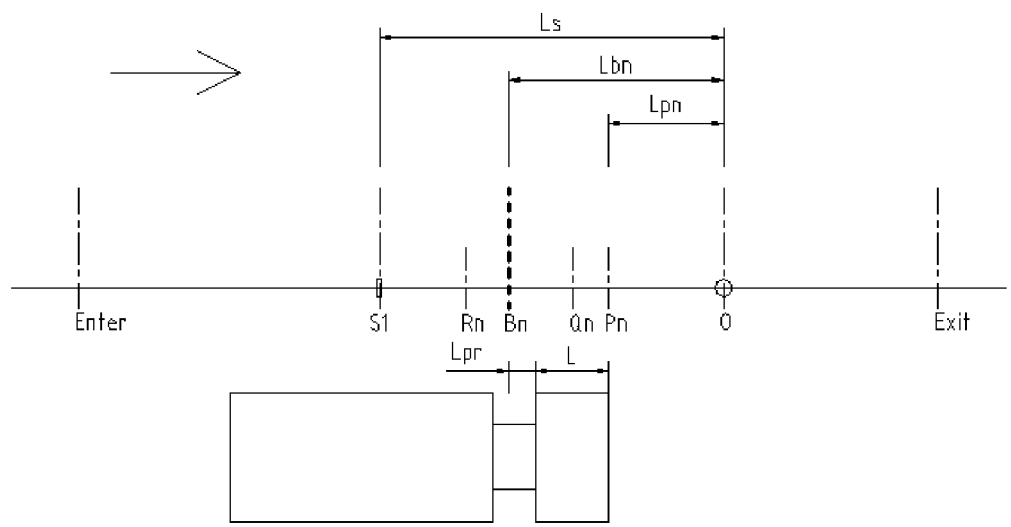

As shown in FIG. 3D, determining the position of the mode switching can includes the following two ways:
① according to the acquired vehicle front edge length L, in combination with real-time position information of the front edge of the vehicle, the scanning control subsystem adopts the corresponding control strategy when the front edge of the vehicle reaches a position $Lp_n$, i.e., the corresponding control point, in which $$Lp_n = Lb_n - L - Lp_r,$$

where $Lp_r$ is an extra protection avoidance length, and its minimum can be set to 0; $b_n$ is a ray source identification, n is a positive integer and $1 \leq n \leq j$, and j is the number of ray sources.
② starting from the time point when the rear edge of the cab was found, the scanning control subsystem adopts the corresponding control strategy such as beam-emitting control, low/high dose switching control, after the vehicle continues to drive a distance $Ls - L_n + Lpr$, where Ls is a distance between the second sensor and the first sensor, $Lb_n$ is a distance between the ray source and the second sensor, and $Ls - Lb_n$ is a distance between the ray source and the second sensor.

Figure 3E:
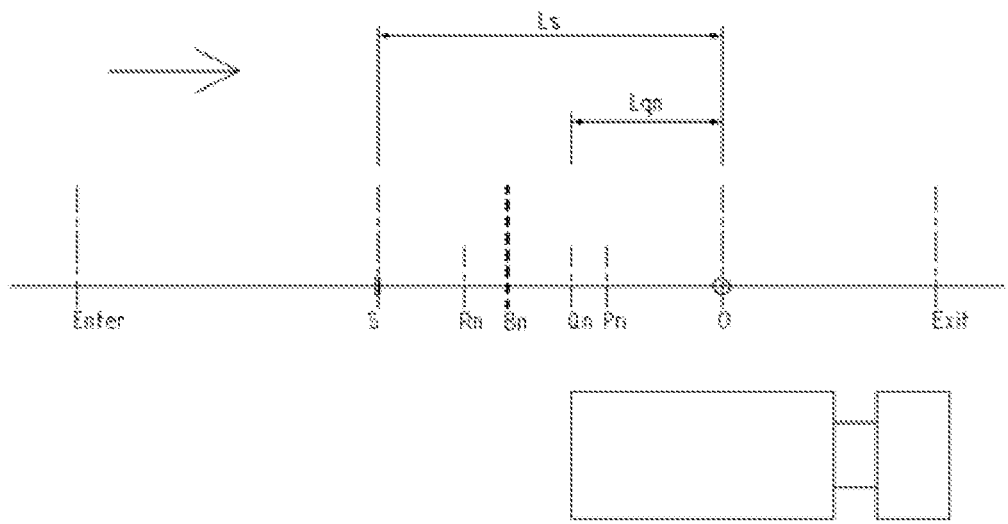

When the vehicle reaches an Exit position (exit of the passage), the system sends out vehicle departure information, and the scanning control system starts a corresponding process, as shown in FIG. 3E.

The positions of the points, R, P, Q, can be determined according to the service requirement for the scanning process, and there is no position relation requirement between each other. Typically, R is set at a point in a negative direction of the ray source, and P and Q are set at points in a positive direction of the ray main beam and can coincide with each other. In view of the time for system calculation, data transmission and system operation, in combination with the maximum speed of the vehicle, there is a minimum distance limit between $B_n$ and S, which is not less than a distance that the vehicle can drive within the system operation time.

By this method, less sensors can be used for providing multiple accurate control points, to enrich the control strategy of the x-ray container/vehicle inspection system, reduce civil engineering usage and the difficulty in system installation and debugging, and reduce the workload, and especially for a bidirectional system, the comprehensive cost of the system is reduced since reuse of part of sensors is supported. In addition, by this method, the acquired image is further provided with depth information of the vehicle profile, which is beneficial to identifying and positioning the rear edge of the vehicle cab with a complex shape. The outputs of multiple control points can enrich the scanning process control strategy, which improves the control accuracy. The vehicle state in the passage is monitored in real time, which greatly improves the response speed to abnormal working conditions such as parking and reversing.

Figure 4:
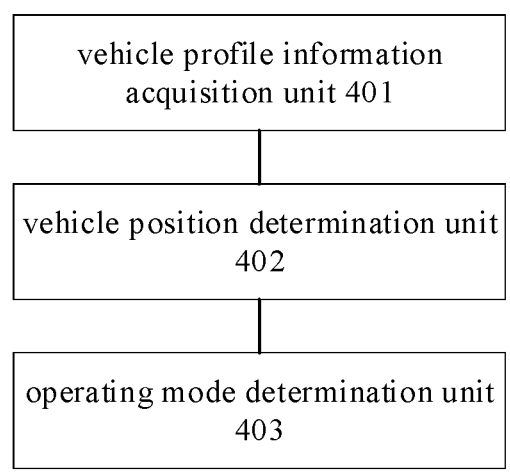
FIG. 4 is a schematic diagram of a vehicle inspection control apparatus according to some embodiments of the present disclosure.

A schematic diagram of a vehicle inspection control apparatus according to some embodiments of the present disclosure is shown in FIG. 4. A vehicle profile information acquisition device 401 can acquire vehicle profile information through the first sensor that performs measurement in the direction perpendicular to the passage direction, and determine the feature point of the vehicle according to the vehicle profile information. In some embodiments, the feature point can include one or more of the rear edge of the cab, the front edge of the warehouse, the rear edge of the vehicle, and the like.

A vehicle position determination device 402 can determine the position of the vehicle in the passage through the second sensor that performs measurement in the passage direction, and determine the position of the feature point according to the position of the vehicle in the passage. In some embodiments, the position of the front edge or the rear edge of the vehicle can be determined, and then the distance between the front edge or the rear edge of the vehicle and the feature point can be determined according to the vehicle profile information, so that the position change of the feature point is reflected by the detected position change of the front edge or the rear edge of the vehicle.

An operating mode determination device 403 can switch the operating mode of the ray source based on the preset strategy according to the position relation between the position of the feature point and the ray source.

Such a vehicle inspection control apparatus can obtain the position and the side profile of the vehicle based on the detection results of the first sensor and the second sensor, and then determines the timing for switching the operating mode of the ray source through position matching, which improves the accuracy of the determined timing for switching the operating mode.

Figure 5:
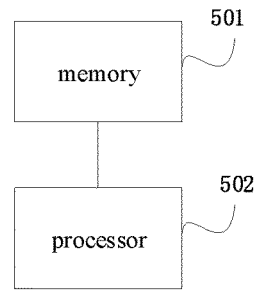
FIG. 5 is a schematic diagram of a vehicle inspection control apparatus according to other embodiments of the present disclosure.

A schematic structural diagram of the vehicle inspection control apparatus according to some embodiments of the present disclosure is shown in FIG. 5. The vehicle inspection control apparatus includes a memory 501 and a processor 502. the memory 501 therein can be a magnetic disk, flash memory, or any other non-volatile storage medium. The memory is configured to store instructions in the corresponding embodiments of the vehicle inspection method above. The processor 502 is coupled to the memory 501, and can be implemented as one or more integrated circuits, e.g., a microprocessor or microcontroller. The processor 502 is configured to execute the instructions stored in the memory, which can improve the accuracy of the determined timing for switching the operating mode.

Figure 6:
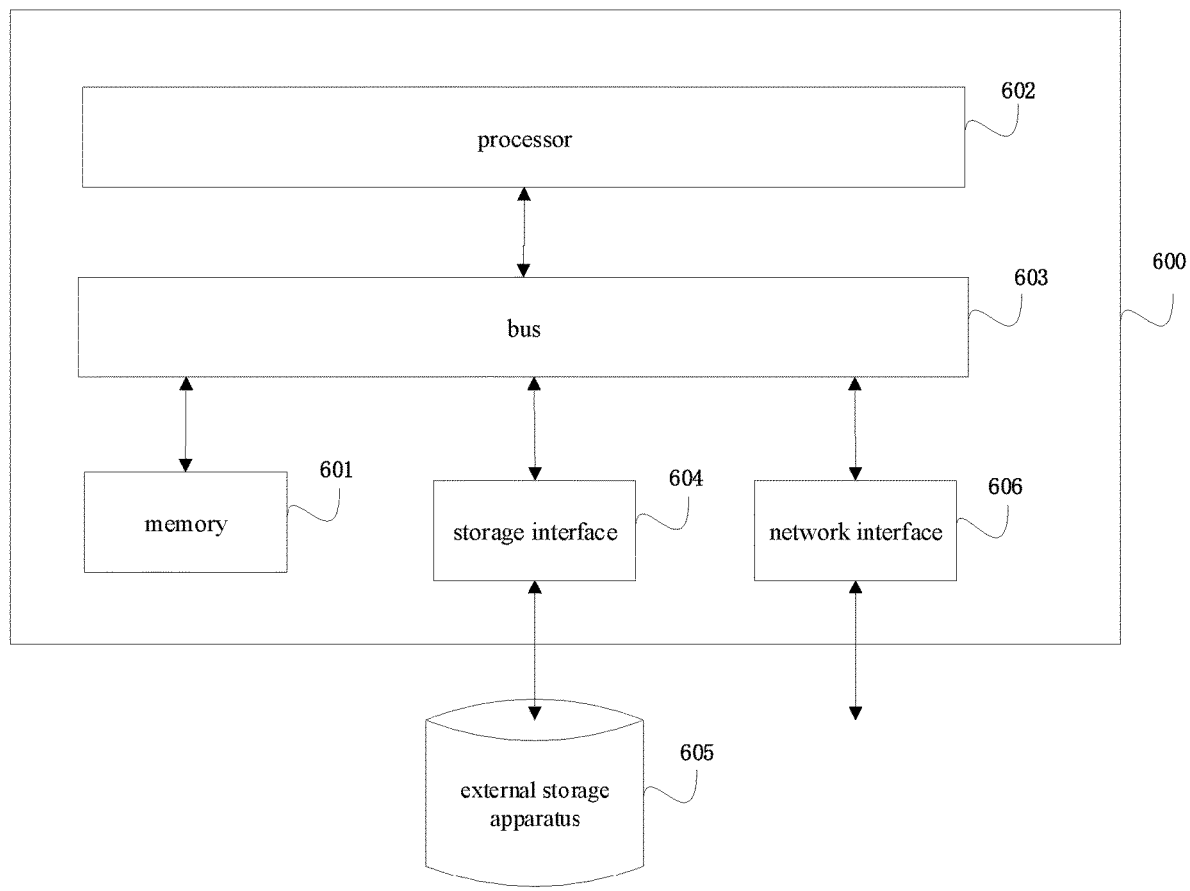
FIG. 6 is a schematic diagram of a vehicle inspection control apparatus according to still other embodiments of the present disclosure.

In some embodiments, as also shown in FIG. 6, the vehicle inspection control apparatus 600 includes a memory 601 and a processor 602. The processor 602 is coupled to the memory 601 through a BUS 603. This vehicle inspection control apparatus 600 can also be connected to an external storage apparatus 605 through a storage interface 604 to call external data, and also to a network or another computer system (not shown) through a network interface 606, which is not described in detail herein.

In this embodiment, the data instructions are stored in the memory and then processed by the processor, which can improve the accuracy of the determined timing for switching the operating mode.

In other embodiments, a computer-readable storage medium has stored thereon computer program instructions which, when executed by a processor, implement steps of the method in the embodiments corresponding to the vehicle inspection method. The embodiments of the present disclosure can be provided as a method, apparatus, or computer program product. Accordingly, the present disclosure can take the form of an entire hardware embodiment, an entire software embodiment or an embodiment combining software and hardware aspects.

Furthermore, the present disclosure can take the form of a computer program product implemented on one or more computer-usable non-transitory storage media (including, but not limited to, disk storage, CD-ROM, optical storage, and so forth) having computer-usable program codes embodied therein.

Figure 7:
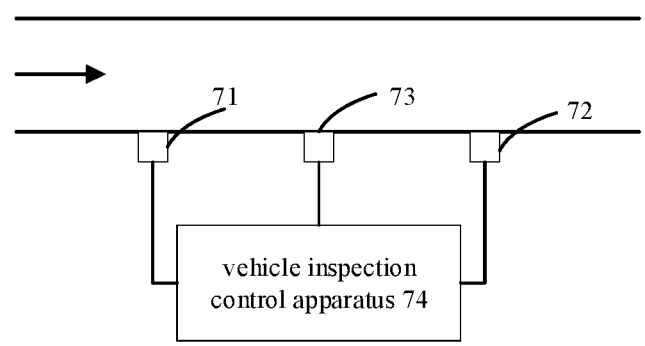
FIG. 7 is a schematic diagram of a vehicle inspection system according to some embodiments of the present disclosure.

A schematic diagram of a vehicle inspection system according to some embodiments of the present disclosure is shown in FIG. 7.

The vehicle inspection system can include the first sensor 71, the second sensor 72, the ray source 73, and any of the vehicle inspection apparatuses 74 mentioned above. The first sensor 71 performs measurement in the direction perpendicular to the passage and acquires the vehicle profile information; the second sensor 72 performs measurement in the passage direction, and determines the position of the vehicle in the passage; the ray source 73 is located in a direction of the first sensor away from the entrance and emits ray beams toward the passage.

Such a vehicle inspection system can obtain the position and the side profile of the vehicle through the first sensor and the second sensor, and then can determine the timing for switching the operating mode of the ray source according to the vehicle profile, and improving the accuracy of the determined timing for switching the operating mode.

In some embodiments, the first sensor can be a measuring light curtain, line array camera, or regional laser sensor, and the second sensor can be a horizontally mounted two-dimensional or three-dimensional regional laser sensor. In some embodiments, second sensors can be arranged in the passage, and thus, the distance between vehicles in the passage can be detected, and improving the efficiency of vehicle detection.

In some embodiments, two first sensors are arranged, and the ray source is arranged between the two first sensors, and realizing bidirectional detection, expanding applicable scenarios of the system and reducing the comprehensive cost of the system.

The present disclosure is described with reference to flowcharts and/or block diagrams of the method, apparatus (system) and computer program product according to the embodiments of the present disclosure. It will be understood that each flow and/or block of the flowcharts and/or block diagrams, and combinations of flows and/or blocks in the flowcharts and/or block diagrams, can be implemented by computer program instructions. These computer program instructions can be provided to a processor of a general purpose computer, special purpose computer, embedded processor, or other programmable data processing device to create a machine, and the instructions, which are executed by the processor of the computer or other programmable data processing device, create means for implementing the functions specified in one or more flows of the flowcharts and/or one or more blocks of the block diagrams.

These computer program instructions can also be stored in a computer-readable memory that can direct a computer or other programmable data processing device to work in a particular manner, and the instructions stored in the computer-readable memory create an article of manufacture including instruction means which implement the functions specified in one or more flows of the flowcharts and/or one or more blocks of the block diagrams.

These computer program instructions can also be loaded onto a computer or other programmable data processing device, to cause a series of operational steps to be performed on the computer or other programmable device to produce a computer-implemented process, and the instructions, which are executed on the computer or other programmable device, provide steps for implementing the functions specified in one or more flows of the flowcharts and/or one or more blocks of the block diagrams.

Thus far, the present disclosure has been described in detail. Some details well known in the art have not been described in order to avoid obscuring the concepts of the present disclosure.

The disclosed method and apparatus can be implemented in a number of ways. For example, the method and apparatus of the present disclosure can be implemented by software, hardware, firmware, or any combination of software, hardware, and firmware. The foregoing sequence for the steps of the method is for illustration only, and the steps of the method of the present disclosure are not limited to the sequence described above unless otherwise stated. Further, in some embodiments, the present disclosure can also be implemented as programs recorded in a recording medium, and these programs contain machine-readable instructions for implementing the method according to the present disclosure. Thus, the present disclosure also covers the recording medium storing the programs for performing the method according to the present disclosure.

What is claimed is:

1. A vehicle inspection method, the method comprising:
   acquiring vehicle profile information of a vehicle through a first sensor that performs measurement in a direction perpendicular to a passage, and determining a feature point of the vehicle according to the vehicle profile information;
   determining a position of the vehicle in the passage through a second sensor that performs measurement in a direction along the passage, and determining a position of the feature point according to the position of the vehicle in the passage; and
   determining position of a control point according to a position relation between the position of the feature point and the ray source, and determining a timing for switching an operating mode of a ray source through position matching, to switching the operating mode of the ray source.

2. The vehicle inspection method according to claim 1, further comprising: in response to determining that the vehicle enters the passage, preheating the ray source.

3. The vehicle inspection method according to claim 2, further comprising:
   in response to determining that the position of the vehicle in the passage reaches a preset trigger-blocking point, stopping preheating the ray source, and the ray source entering a first operating state, wherein the trigger-blocking point is located between the ray source and an entrance of the passage.

4. The vehicle inspection method according to claim 1, wherein the switching an operating mode of a ray source based on a preset strategy according to a position relation between the position of the feature point and the ray source comprises:
   determining a beam-stopping control point or a beam-emitting control point for trigger-blocking the switching of the operating mode of the ray source, according to the position relation between the position of the feature point and the ray source; and
   in response to determining that a front edge of the vehicle reaches the beam-stopping control point or the beam-emitting control point of the front edge, or that a rear edge of the vehicle reaches the beam-stopping control point or the beam-emitting control point of the rear edge according to a detection result of the first sensor, switching the operating mode of the ray source based on the preset strategy.

5. The vehicle inspection method according to claim 4, wherein in response to determining that the front edge of the vehicle reaches the beam-stopping control point or the beam-emitting control point, or that the rear edge of the vehicle reaches the beam-stopping control point or the beam-emitting control point, that switching the operating mode of the ray source based on the preset strategy comprises:
   in response to the position of the front edge or the rear edge of the vehicle is matched with the corresponding beam-emitting control point, controlling the ray source to start emitting rays in a next mode; and
   in response to the position of the front edge or the rear edge of the vehicle is matched with the corresponding beam-stopping control point, controlling the ray source to stop emitting rays in current mode.

6. The vehicle inspection method according to claim 4, wherein the beam-stopping control point and the beam-emitting control point are located on a side of the ray source away from an entrance of the passage.

7. The vehicle inspection method according to claim 4, further comprising:
   determining a number of times of switching the operating mode and the corresponding feature point of the vehicle in each switching according to the preset strategy,
   wherein a number of the beam-stopping control point and the beam-emitting control point is matched with the number of times of switching the operating mode.

8. The vehicle inspection method according to claim 1, wherein the first sensor is located on a side of the ray source close to a passage entrance, and a distance between the ray source and the first sensor is not less than a preset distance threshold.

9. The vehicle inspection method according to claim 1, wherein the feature point comprises a rear edge of a cab, and the switching an operating mode of a ray source based on a preset strategy according to a position relation between the position of the feature point and the ray source comprises:
   determining a length of the cab according to a position of the rear edge of the cab in the vehicle profile information, and determining the position of a front edge of the vehicle as the beam-emitting control point in response to the position of the rear edge of the cab is matched with the ray source, and in response to the position of the front edge of the vehicle is matched with that of the beam-emitting control point, controlling the ray source to start emitting rays;

or determining the length of the cab according to the position of the rear edge of the cab in the vehicle profile information, and determining the position of the rear edge of the vehicle as the beam-emitting control point in response to the position of the rear edge of the cab is matched with the ray source, and in response to the position of the rear edge of the vehicle is matched with that of the beam-emitting control point, controlling the ray source to start emitting rays.

10. The vehicle inspection method according to claim 1, wherein the feature point comprises a rear edge of the vehicle, and the switching an operating mode of a ray source based on a preset strategy according to a position relation between the position of the feature point and the ray source comprises:

determining the position of the rear edge of the vehicle as the beam-stopping control point in response to the position of the rear edge of the vehicle is matched with that of the ray source according to the position of the rear edge of the vehicle in the vehicle profile information, and in response to the position of the rear edge of the vehicle is matched with that of the beam-stopping control point, controlling the ray source to stop emitting rays;

or determining a length of the vehicle according to the position of the rear edge of the vehicle in the vehicle profile information, and determining the position of a front edge of the vehicle as the beam-stopping control point in response to the position of the rear edge of the vehicle is matched with that of the ray source, and in response to the position of the front edge of the vehicle is matched with that of the beam-stopping control point, controlling the ray source to stop emitting rays.

11. A vehicle inspection control apparatus comprising:
a vehicle profile information acquisition unit, configured to acquire vehicle profile information of a vehicle through a first sensor that performs measurement in a direction perpendicular to a passage, and determine a feature point of the vehicle according to the vehicle profile information;
a vehicle position determination unit, configured to determine a position of the vehicle in the passage through a second sensor that performs measurement in a direction along the passage, and to determine a position of the feature point according to the position of the vehicle in the passage; and
an operating mode determination unit, configured to determine a position of a control point according to a position relation between the position of the feature point and the ray source, and determine a timing for switch an operating mode of a ray source through position matching, to switch the operating mode of the ray source based on a preset strategy.

12. A vehicle inspection control apparatus comprising:
a memory; and
a processor coupled to the memory, the processor being configured to, based on instructions stored in the memory, perform a method comprising:
acquiring vehicle profile information of a vehicle through a first sensor that performs measurement in a direction perpendicular to a passage, and determining a feature point of the vehicle according to the vehicle profile information;
determining a position of the vehicle in the passage through a second sensor that performs measurement in a passage direction along the passage, and determining a position of the feature point according to the position of the vehicle in the passage; and
determining a position of a control point according to a position relation between the position of the feature point and the ray source, and determining a timing for switching an operating mode of a ray source through position matching, to switching the operating mode of the ray source.

13. The vehicle inspection control apparatus according to claim 12, wherein the first sensor is located on a side of the ray source close to a passage entrance, and a distance between the ray source and the first sensor is not less than a preset distance threshold.

14. A vehicle inspection system comprising the vehicle inspection control apparatus according to claim 12, and further comprising:
a first sensor configured to perform measurement in a direction perpendicular to a passage, for acquiring vehicle profile information of a vehicle;
a second sensor configured to perform measurement in a direction along the passage, for determining a position of the vehicle in the passage; and
a ray source, located in a direction of the first sensor away from an entrance, for emitting ray beams toward the passage.

15. The vehicle inspection system according to claim 14, wherein the vehicle inspection system further meets at least one of:
the vehicle inspection system comprises one or more second sensors; or
the vehicle inspection system comprises one or more ray sources.

16. The vehicle inspection control apparatus according to claim 12, wherein the processor is further configured to preheat the ray source in response to determining that the vehicle enters the passage.

17. The vehicle inspection control apparatus according to claim 16, wherein the processor is further configured to
stop preheating the ray source in response to determining that the position of the vehicle in the passage reaches a preset trigger-blocking point, the ray source entering a first operating state, wherein the trigger-blocking point is located between the ray source and an passage entrance of the passage.

* * * * *